United States Patent
Chandler

[11] 3,922,920
[45] Dec. 2, 1975

[54] FLUID SAMPLING DEVICE

[76] Inventor: Stephen Chandler, 10571 Magdalena, Los Altos, Calif. 94022

[22] Filed: June 11, 1973

[21] Appl. No.: 368,830

[52] U.S. Cl. .......................................... 73/422 TC
[51] Int. Cl.² ........................................ G01N 1/10
[58] Field of Search ........ 73/421 B, 422 TC, 422 R; 222/205, 438

[56] References Cited
UNITED STATES PATENTS
1,344,949  6/1920  Karanagh .................. 222/205
FOREIGN PATENTS OR APPLICATIONS
86,749  4/1959  Denmark ..................... 73/422 R Primary Examiner—S. Clement Swisher
Attorney, Agent, or Firm—Limbach, Limbach & Sutton

[57] ABSTRACT

An apparatus and method for providing the capture of a fluid sample from a fluid source utilizing a chamber whose metering portion holds a pre-set volume of fluid, a vacuum or fluid pump, and inlet and outlet conduit lines. The fluid sample is collected by removing excess fluid from the chamber through a port in communication with said metering portion of said chamber.

12 Claims, 6 Drawing Figures

FLUID SAMPLING DEVICE

BACKGROUND OF INVENTION

The present invention relates to a novel apparatus and method for sampling fluids by transferring fluid from a fluid source to a sample holder utilizing either a fluid pump or a vacuum pump.

Present liquid sampling devices utilize unreliable float valves, inconvenient dippers or scoops, or contain small orifices which tend to clog the sampling mechanisms. Many devices are restricted to slow flow or laminar flow conditions severely limiting their application. Also, present fluid samplers use small diameter lines causing flow problems associated with slurries and other solid bearing liquids. The use of multiple samples have in the past presented the problem of not obtaining a representative liquid sample from a fluid source.

All the present fluid samplers function with either a vacuum pump or a fluid pump, but not both, unless major piping changes are contrived resulting in multitudinous restrictions to the free flow of fluid within the sampling system.

SUMMARY OF INVENTION

This invention overcomes the previous problems heretofore mentioned by employing a metering mechanism that gathers a fluid sample representative of the fluid source, in a simple and reliable manner.

The sampling device of the present invention has a fluid sample holder with inlet and outlet conduits permitting a steady or intermittent flow of fluid into the fluid sample holder. The fluid sample holder encloses a hollow chamber which divides into a free air space and a metering portion; the imaginary horizontal plane dividing the chamber passes through the lowest point of the inlet conduit means and outlet conduit means of the chamber. The volume of the chamber, and particularly the metering portion, may be varied as desired by lowering or raising or introducing a fluid displacement body into or out of the metering portion of the chamber. This may be accomplished by attaching the fluid displacement body to a removable wall of the chamber and rotating the wall or by raising or lowering the fluid displacement body independently of the chamber walls.

While introducing fluid to the apparatus, a fluid sample of a specific volume collects within the metering portion, the excess fluid draining through the outlet conduit either to the fluid source to waste or elsewhere. A fluid sample may be transferred from the chamber's metering portion by simply opening a cock or valve at the chamber's sample discharge port by siphoning, by tipping the chamber, or by any other manner.

The free air space within the chamber permits the employment of a positive fluid pump within the inlet conduit means or the utilization of a vacuum pump mounted on the exterior of the chamber with communication to the free air space within, in association with a valve to control the air pressure within the chamber.

The elimination of float valves and other moving parts with the chamber creates a reliable and uncomplicated sampling device and allows large sized inlet and outlet conduits to deliver the fluid to the chamber. Thus the fluid flows in a turbulent or non-turbulent state and clogging of the apparatus becomes minimal.

Flushing of the apparatus is simply accomplished by running a sample fluid through the device for a short period of time before sampling or by backflushing in either the vacuum or pressure mode of operation.

The volume adjustment may be effected manually or automatically according to the flow rate, volume or other characteristic of the fluid source or automatically at pre-set time intervals utilizing a timing device. Likewise the removal of samples may be accomplished manually or automatically.

DESCRIPTION OF THE DRAWINGS

The invention may be further understood by referring to the accompanying drawings in which.

DESCRIPTION OF PREFERRED EMBODIMENTS

Figure 1:
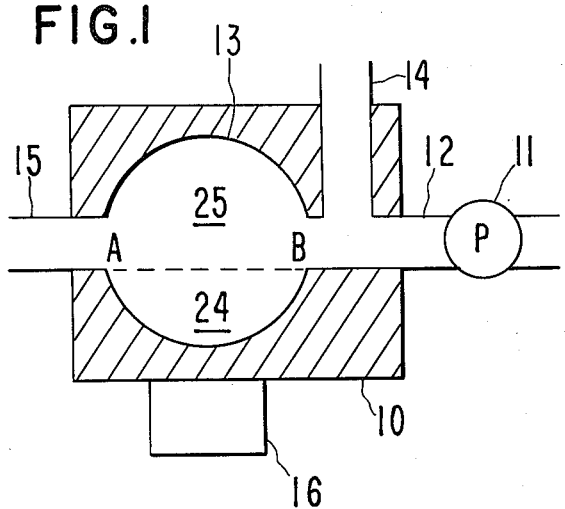
FIG. 1 is a schematic view of the fluid sampling device in the pressure mode of operation.

The apparatus of the present invention in the positive pressure pump mode basically comprises, as depicted in FIG. 1, an outer casing or body member 10 enclosing a hollow chamber 13 having an inlet line 12 and an outlet line 15. A pressure pump 11 provided in the inlet line 12 delivers the fluid to the hollow chamber 13. Communicating with the hollow chamber 13 is a port 16 for removing the fluid sample. An imaginary horizontal plane depicted by imaginary line AB passing through the lowest points of inlet and outlet lines 12 and 15 divides chamber 13 into a free air space 25 above the horizontal plane depicted by imaginary line AB and a fluid metering portion 24 below the horizontal plane depicted by imaginary line AB. A pressure adjustment line 14 communicating with the free air space can be provided to aid in equalizing air pressure within the hollow chamber 13 with atmospheric pressure as well as to permit utilization of the metering device with both pressure and vacuum pumps.

Figure 2:
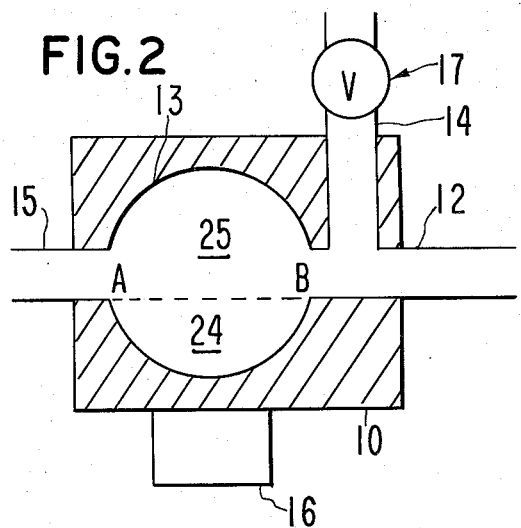
FIG. 2 is a schematic view of the fluid sampling device in the vacuum mode of operation.

FIG. 2 depicts the present invention in the vacuum pump mode where a vacuum pump 17 is placed in the pressure adjustment line 14 in place of the pressure pump 11 in the inlet line 12 to draw fluid into the hollow chamber 13.

Figure 3:
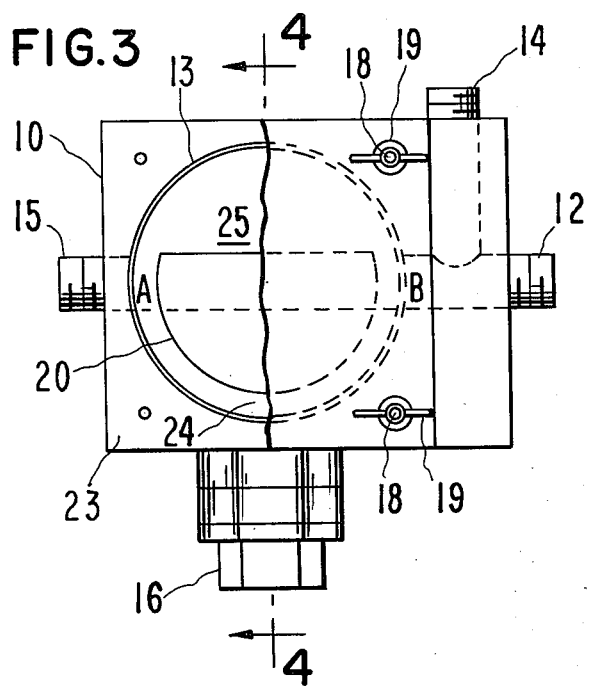
FIG. 3 is a frontal view of an embodiment of the fluid sampling device with a broken away section showing a fluid displacement body therein.

A specific embodiment of the present invention is depicted in FIG. 3. The casing 10, rectangular in elevation, encloses a hollow substantially cylindrical chamber 13 having the principle axis thereof horizontal and parallel to the horizontal plane depicted by imaginary line AB. Attaching a solid, substantially semicylindrical fluid displacement body 20 to a removable vertical wall 23 of the casing 10 so that the displacement body 20 projects into the chamber 13 when the wall 23 is attached to fix the fluid volume of the metering portion 25 of the chamber 13 depending on the orientation of the displacement body as described below.

In the illustrated embodiment the wall 23 is removably mounted on the casing 10 by equally spaced studs 18 which project through apertures in wall 23 and receive wing nuts 19. An O ring 26 (see FIG. 4) surrounding the displacement body projecting into chamber 13 is squeezed by a tapered surface on the receiving wall portion of chamber 13 to establish the fluid seal.

Fluid is introduced through an inlet line 12 into the chamber 13 and excess fluid is drained through the outlet line 15. While in the pressure pump mode, the pressure adjustment line 14 remains open permitting additional free air communication with space 25. While in the vacuum pump mode, a vacuum pump 17 (see FIG. 2) is connected to the pressure adjustment line 14 and the outlet line 15 is temporarily sealed. After filling the chamber 13 using either a vacuum pump 17 or pressure pump 11 with a sufficient fluid to fill the chamber to substantially the height of the horizontal plane depicted by imaginary line AB, any excess fluid drains through the outlet conduit line 15 which must be unsealed if the vacuum pump 13 is employed. The fluid remaining in the metering portion 24 of chamber 13 constitutes the desired fluid sample which is removed through the drain 16 and collected.

Figure 4:
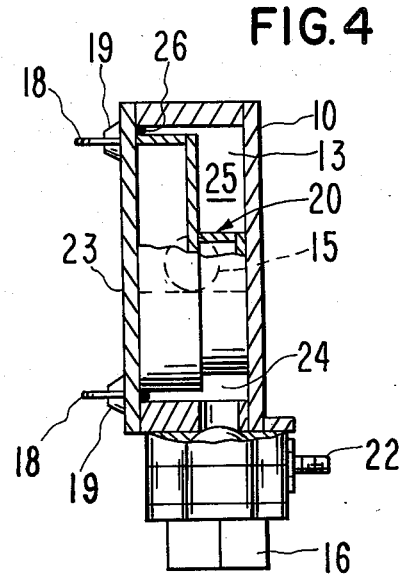
FIG. 4 is an end view, partially in section, of FIG. 3 taken along line 4—4 in the direction shown by the arrows.

FIG. 4 depicts a ball valve 22 which allows the removal of a fluid sample through port 16 and fluid displacement body 20 positioned in relation to the outlet conduit line 15. Imaginary line AB depicts the horizontal plane separating the chamber 13 into a free air space 25 above the plane and a metering portion 24 below the plane. An O ring 26 in association with studs 18 and wing nuts 19 allows attachment of vertical wall 23 which seals chamber 13.

Figures 5, 6:
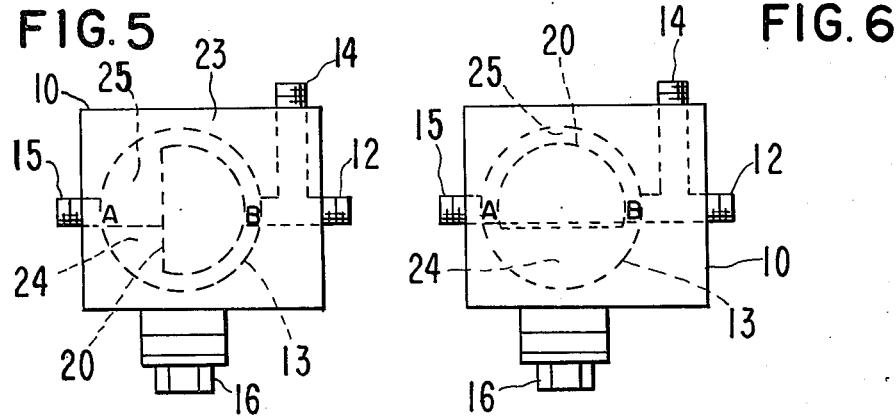
FIG. 5 and FIG. 6 are schematic views of the fluid sampling device depicting the fluid displacement body in various positions within.

FIGS. 5 and 6 show a variety of positions of the fluid displacement body 20 in relation to the horizontal plane depicted by line AB within the hollow chamber attained by rotating the removable vertical wall 23 of the casing 10.

Although the embodiment herein describes a rectangular solid casing 10, a cylindrical hollow chamber 13 and a semicylindrical fluid displacement body 20, the present invention is not limited to these shapes. Also, several means may be employed to remove a fluid sample from the metering portion 24 other than a ball valve 22 located at the lowest point of the chamber 13.

Likewise the fluid displacement body 20 may be positioned in a plurality of positions within the chamber 13 independent of the vertical wall 23 or the studs 18. For example, a single central stud can be used and the displacement body rotated therearound. Rotation can be manual or motorized in such case.

What is claimed is:

1. A fluid sampling apparatus comprising
a fluid sample holder comprising a body member defining a hollow chamber with inlet conduit means for communicating between said chamber and a fluid source;
an outlet conduit means for said chamber;
each of said inlet and outlet conduit means having the lowest portion thereof in the same horizontal plane when the sampling apparatus is positioned for taking a sample;
said inlet and outlet conduit means defining a fluid metering portion of said chamber below said horizontal plane,
said body member providing continuous free air communication between said fluid metering portion, said inlet conduit means and said outlet conduit means whereby fluid passing through said inlet means flows through the fluid metering portion of said chamber to said outlet means, and
a conduit means communicating with said metering portion of said chamber for removing the fluid sample.

2. A fluid sampling apparatus as defined in claim 1 which additionally comprises fluid pump means connected with said inlet conduit means for delivering fluid from a fluid source into said chamber and through said fluid metering portion thereof.

3. A fluid sampling apparatus as defined in claim 1 which additionally comprises a vacuum pump means connected to said chamber for drawing fluid from a fluid source into said chamber and through said fluid metering portion thereof, and valve means associated with said vacuum pump for controlling pressure within said chamber.

4. A fluid sampling apparatus comprising
a fluid sample holder comprising a body member defining a hollow chamber with inlet conduit means for communicating between said chamber and a fluid source;
an outlet conduit means for said chamber;
said inlet and outlet conduit means defining a horizontal plane passing through the lowest point of said inlet and outlet conduit means defining a fluid metering portion of said chamber therebelow and a free air communication between said inlet conduit means and said outlet conduit means thereabove,
a conduit means communicating with said metering portion of said chamber for removing the fluid sample,
a solid, fluid displacement body, and
a means for mounting said body in a plurality of positions in said chamber for defining different fluid volumes in said metering portion of said chamber.

5. A fluid sampling apparatus as defined in claim 4 wherein said solid fluid displacement body is positioned in a plurality of positions in said chamber where said displacement body is at least in part below said horizontal plane in said chamber.

6. A fluid sampling apparatus as defined in claim 4 which additionally comprises fluid pump means connected with said inlet conduit means for delivering fluid from a fluid source to said chamber.

7. A fluid sampling apparatus as defined in claim 4 which additionally comprises a vacuum pump means connected to said chamber for drawing fluid from a fluid source into said chamber and valve means associated with said vacuum pump means for controlling pressure within said chamber.

8. A fluid sampling apparatus as defined in claim 4 where said fluid sample holder comprises a body member defining a cylindrical hollow chamber; said solid fluid displacement body comprises a substantially semicylindrical body; and said means for mounting said body in a plurality of positions comprises means for affixing said body member in a plurality of different positions, each position having a different volume of the semicylindrical body below said horizontal plane.

9. A method for fluid sampling comprising introducing a continuous flow of fluid from a fluid source through a horizontal inlet conduit means communicating with a body member defining a hollow chamber communicating with an outlet conduit means; filling said chamber with said fluid and introducing a continuous flow of fluid into said outlet conduit means; fixing the volume of a fluid metering portion of said chamber, defined as that portion of said chamber below a horizontal plane passing through the lowest points of said inlet and outlet conduit means, providing continuous free air communication between said inlet conduit means, said outlet conduit means and said metering portion; removing fluid from said chamber in excess of said fixed volume of said metering portion of said chamber; retaining a fluid sample defined as the fluid remaining in said metering portion of said chamber; and removing said fluid sample.

10. A method of fluid sampling comprising introducing a continuous flow of fluid from a fluid source through an inlet conduit means communicating with a body member defining a hollow chamber communicating with an outlet conduit means; filling said chamber with said fluid; fixing the volume of a fluid metering portion of said portion, defined as that portion of said chamber below a horizontal plane passing through the lowest points of said inlet and outlet conduit means, including changing the volume of the fluid metering portion by moving at least a portion of a fluid displacement body in said metering portion of said volume; providing a free air communication above said horizontal plane; draining fluid from said chamber in excess of said fixed volume of said metering portion of said chamber; retaining a fluid sample defined as the fluid remaining in said metering portion of said chamber; and removing said fluid sample.

11. A method as described in claim 9 wherein said step of introducing a fluid from a fluid source includes pumping the fluid thereinto with a fluid pump means.

12. A method as described in claim 9 wherein said step of introducing a fluid from a fluid source includes drawing the fluid thereinto through said inlet conduit means with a vacuum pump.

* * * * *